United States Patent [19]

Hohner

[11] Patent Number: 4,991,116
[45] Date of Patent: Feb. 5, 1991

[54] COMBINED DIGITIZER AND PLOTTER FOR COMPUTER AIDED DRAWING

[76] Inventor: Jack Hohner, N. 2321 Coleman Rd., Spokane, Wash. 99212

[21] Appl. No.: 460,540

[22] Filed: Jan. 3, 1990

[51] Int. Cl.$^5$ ............................................. G06K 15/00
[52] U.S. Cl. ...................................... 364/520; 346/145
[58] Field of Search ................................ 364/518-520, 364/235 MS, 235.7 MS, 237.7 MS, 237.1 MS, 236.8 MS, 929.3 MS, 930 MS, 929.12 MS; 346/145, 139 R, 111, 112, 113; 340/706, 708, 709, 710

[56] References Cited

U.S. PATENT DOCUMENTS

| | | | |
|---|---|---|---|
| 4,371,893 | 2/1983 | Rabeisen | 364/520 |
| 4,451,895 | 5/1984 | Sliwkowski | 364/520 |
| 4,707,109 | 11/1987 | Kanno et al. | 364/520 |
| 4,730,186 | 3/1988 | Koga et al. | 364/520 |
| 4,764,880 | 8/1988 | Pearl | 364/520 |
| 4,920,422 | 4/1990 | Lapiekre | 364/520 |

Primary Examiner—Arthur G. Evans
Attorney, Agent, or Firm—Keith S. Bergman

[57] ABSTRACT

Apparatus combining the input function of a digitizer and the output function of a plotter to provide a current simultaneous plot of computer input as traditionally provided by a cathode ray tube display is disclosed for computer aided drawing. The apparatus provides a casement having a transparent upper working surface comprising a digitizer pad that is operated responsive to position of a separated puck. Transparent drawing film is releasably maintained in a uniquely determined position by a peg type fastening element on the underside of the transparent upper working surface. Flat-bed type plotting apparatus is carried in the casement beneath the drawing film for operative contact with the undersurface thereof. The plotting apparatus provides a marking member and a correction member. The upper working surface of the casement provides plural switches to input keyboard type instructions to an associated computer. Image plotting by the apparatus similar to substantially simultaneous with data input in the fashion of a cathode ray tube display. The apparatus operates with existing software and driver devices with minor modifications.

13 Claims, 6 Drawing Sheets

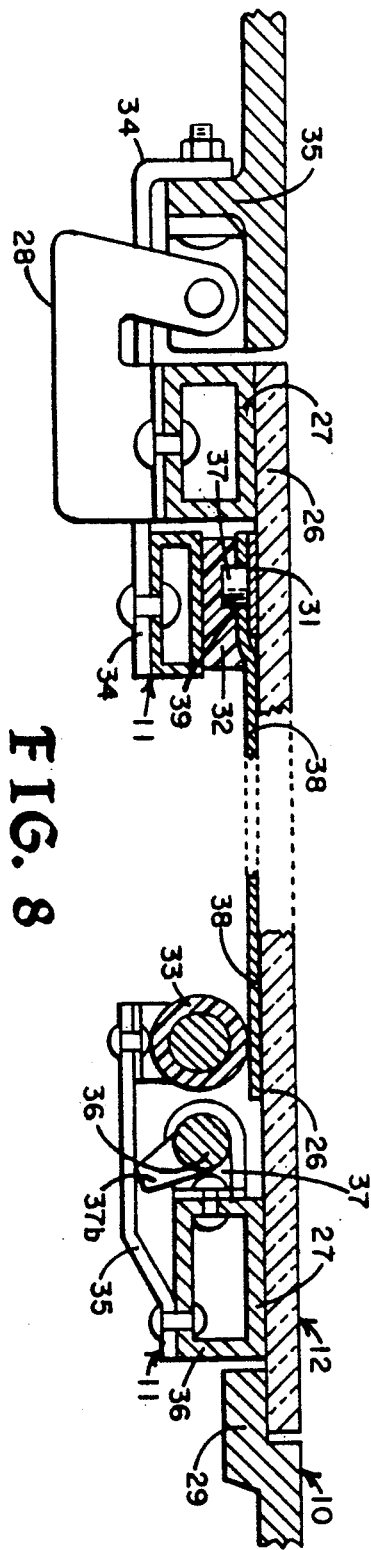
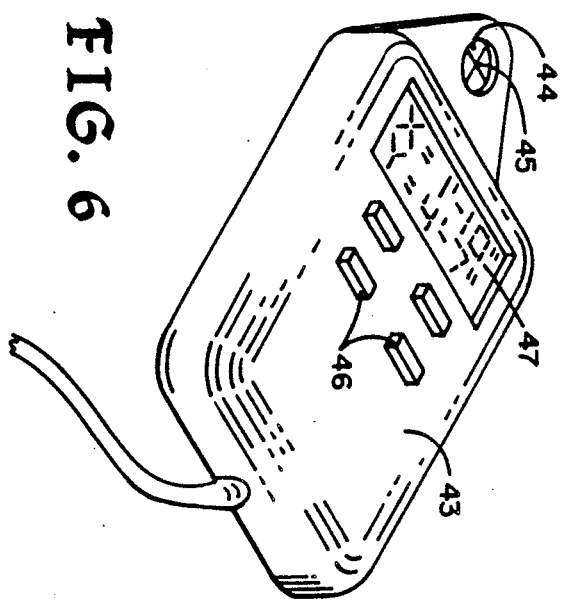
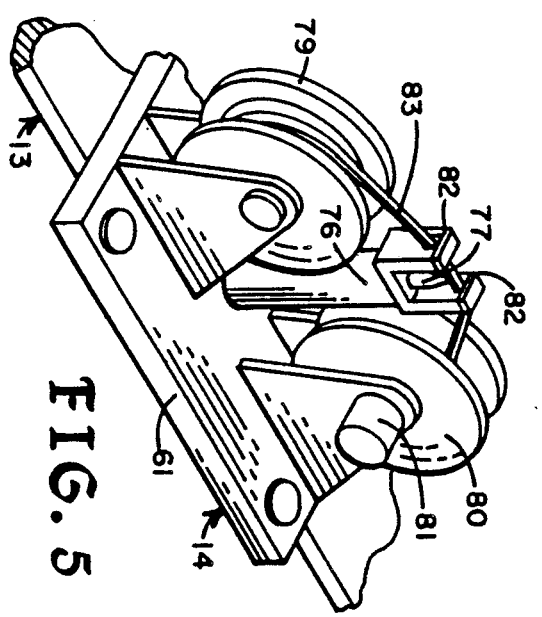

COMBINED DIGITIZER AND PLOTTER FOR COMPUTER AIDED DRAWING

BACKGROUND OF INVENTION

1. RELATED APPLICATIONS

There are no applications related hereto heretofore filed in this or any foreign country.

2. FIELD OF INVENTION

This invention relates generally to an input and output device for computer aided drawing, and more particularly to such a device that provides the functions of a traditional digitizer and flatbed plotter with editing means to display corrected images substantially simultaneously with input.

DESCRIPTION OF PRIOR ART

Computer aided drawing (CAD) has increased rapidly in both usage and sophistication with the advent of computers having faster central processing units and larger memories, until in the present day CAD comprises a substantial portion of commercial technical drawing. Output display devices for such drawing that provide permanent copy, however, generally have not kept pace with the sophisticated development of computers and peripherals, they have not been combined with input devices, and in general they constitute the weakest link in CAD apparatus.

Heretofore in general, output displays for CAD have developed along two substantially different courses, the first a cathode ray tube (CRT) display which provides a transient display and secondly, a plotter-type display providing an image on drawing media by either a flatbed or roller-type plotter. Various matrix type printers, including especially laser printers, have been used for creating CAD drawings, but to date these devices have not been particularly popular for this purpose because generally the desired CAD output is of a size greater than is commonly available from ordinary commercial forms of matrix printers, and oftentimes the nature of matrix output is not of a sufficiently high quality or comparable to that produced by traditional line plotters.

The known output displays present inherent problems for CAD users. The CRT type display has an essential overall size limitation defined by the display tube face, and its quality of output oftentimes has not been good and in general has been of substantially lower definition than a line plotter created display. Various software and hardware improvements have alleviated these CRT problems to some degree in the present day, but have not fully resolved them. Software created "zoom" functions allow an enlarged portion of a drawing to be selectively displayed on a CRT, and various hardware additives such as the "EGA" and "VGA" video boards and associated compatible CRT tubes have increased the resolution of displays, but not too greatly and then only with substantially increased cost. Nonetheless, a single high quality display of size above major dimension of about 14 to 16 inches cannot be produced on presently existing and merchandised CRTs commonly used with personal computers (PCs). Whatever the quality of a CRT output, however, it still remains a transitory type output without any permanent hard copy, at least without the use of unusual and extraordinary means of producing it, such as by photography.

Traditional line plotters alleviate many of the problems associated with CRT displays, but do not allow a concurrent display of data as it is input into a computer system. Rather, line plotters create a two-dimensional display on drawing media after the data upon which that display is based has been completely input into a computer system and generally after it is memorialized in a file. Presently existing plotters have not had the ability to simultaneously display data upon its input and additionally by reason of their operation, generally have required a substantial period of time to create a two-dimensional drawing from digital data stored in a computer accessible file, though the displays created do have substantial accuracy of about 0.001 inch or less and provide images at a size as large as desired for any practical purposes.

The systems for inputting CAD data to a computer, though quite sophisticated, have also suffered from some essential deficiencies. In general the input of CAD data has not been directly related, or even particularly relatable, to a physical drawing that already may partially exist in the computer system, either in its random access memory or files, at least in any convenient fashion. Data input from a keyboard is obviously not at all directly related to the configuration of an object being drawn or to a representation of an object being created. Such data may be somewhat more closely related to its spatial configuration by use of mouse or digitizer input devices, but even with the use of these devices the data is not directly related in any convenient or contemporaneous fashion to the actual drawing that is being created.

My invention seeks to resolve these problems by providing apparatus that combines the functions of a puck operated digitizer and a flatbed type plotter while providing editing means for the plotter. A line drawn image is presented on drawing media in the apparatus beneath its transparent working surface. The drawing simultaneously displays input to the random access memory (RAM) of a computer system in a fashion similar to a CRT, so that additional drawing input may be created by direct input from a puck of a digitizer moved with reference to the already existing drawing. By doing this, my invention creates functions and results that are different from either known digitizers or plotter display systems. Known line plotters have not created a display simultaneously with input into a computer, as does my display system and known digitizers have not used a partially created drawing as a basis for further drawing input.

A display system that performs these functions of my device must necessarily have some means for correcting existing images or portions of them, as this editing function is provided by normal CAD software. My plotting system provides this function and again by so doing differs from known plotters heretofore used in CAD drawing.

The drawing media or film for use with my apparatus provides plural spaced holes which releasably maintain the film in a unique position on support pegs so that the film may be removed from the apparatus at any time for storage or other use and later re-established in the same unique position in which it initially existed in the apparatus, so that drawing may be continued or corrections made as might be desired. In general, this type of drawing film repositioning and the ability to correct drawings have not been provided by existing CAD plotters, and normally drawings made by them may not be re-aligned for further drawing, correction or input. This feature increases the functionality of my apparatus, avoids lost time in requiring drawings to be completely replotted when additions or changes are made in them, and does not require the multiple replotting of entire drawings after sequential additions or changes are made.

My positioning system for drafting film also allows the film to be removed from the plotter mechanism at various stages of drawing completion so that prints can be made and the film later repositioned so drawing thereon may be finished, which generally is not possible, or at least practical, with present day CAD systems.

My digitizer also differs from ordinary digitizers of the present day in that the associated plotter displays an already created portion of a drawing through a transparent digitizer surface so that future drawing may be done with reference to drawing already completed. Present day digitizers do not allow function and in general allow input only without direct reference to drawing data already existent. This is a convenient feature as it allows drawing to proceed in the normal fashion in which it usually would progress were a draftsman drawing in traditional manual manner by using some type of marker on a sheet of drawing media, but yet provides all of the benefits of CAD type drawing.

A CRT screen bas been used in conjunction with a digitizer type input device in the past for some types of computer input, but in general this type of input has not been of a CAD nature and the CRT screen rather essentially and inherently limits the size of the drawing that could be displayed for input. The digitizer structure of my apparatus also allows traditional amenities of presently known digitizers, including pad-like input matrices that simulate some of the input of an ordinary computer keyboard or multiply associated elements of it (macros).

My invention resides not in any one of these features per se, but rather in the synergistic combination of all of its structures which give rise to the functions necessarily flowing therefrom, as herein specified and claimed.

SUMMARY OF INVENTION

My invention provides a relatively thin box-like casement having a rigid, transparent upper working surface somewhat larger than drawings to be plotted. The underside of the upper working surface provides at one side a pin-type mounting structure to interfit with pre-established holes in drafting film to uniquely position that film and in cooperation with an opposed fastening element, to positionally maintain the film with some tension.

A plotter structure is carried by the casement spacedly beneath the upper working surface. The plotter structure provides a carriage beam movable between the sides of the top structure and a scribing and editing carriage movable along the carriage beam between the casement front and back, both motions being responsive to computer generator instructions in a fashion similar to a present day flatbed plotter. The scribing and editing carriage provides drawing head structure with one or more traditional marking devices and editor structure to remove unwanted image portions deleted by CAD editing functions. One species of editor structure provides an impact erasing device similar to a matrix printer head and another species provides a rotary type erasing device.

A digitizer pad is embodied in the transparent upper working surface of the housing. A physically separate, manually manipulable puck communicates with the digitizer pad to translate puck position relative to the pad in conjunction with traditional CAD programs and device driver software into computer cognizable data. One secondary species of digitizer provides the pad structure spacedly beneath the transparent working surface and beneath the plotter structure, and other secondary species may use audio or radio operated digitizers that provide operative mechanism on the upper working surface.

For operation, the digitizer and plotter structures both communicate through appropriate device drivers with, and are controlled by, the central processing unit of a computer using traditional CAD software programs. The plotter displays information in substantially the same fashion as that information is normally displayed on a CRT visual display, so that input information is displayed simultaneously upon input. The digitizer may be provided with traditional matrix type key pad structure to additionally provide various input functions of an ordinary computer keyboard.

In providing such device, it is:

A principal object of my invention to combine a flat bed plotter and a digitizer to simultaneously provide the functions of both mechanisms in computer aided drawing systems.

A further object of my invention is to provide such apparatus that draws an image defined by a CAD system on drawing film and edits that image, both immediately responsive to input data.

A further object of my invention is to provide such apparatus that has a digitizer associated with the plotter so that the digitizer may input drawing information directly from the image of the drawing produced by the plotter from random access memory (RAM) while that drawing is being produced.

A further object of my invention is to provide such apparatus that releasably mounts drawing film in a uniquely positioned fashion so that such film may be removed and re-established in a unique position for continuation of drawing and editing operations.

A further object of my invention is to provide such apparatus that operates with known CAD software and device drivers with only slight, readily accomplished modification.

A still further object of my invention is to provide such apparatus that may have the various amenities of known digitizers, including matrix type function pads that simulate the action of keyboard type input devices and radio linked pucks.

A still further object of my invention to provide such apparatus that has the amenities of known flatbed plotters and may reproduce drawings with the accuracy of such plotters and on the various media with which those plotters presently operate.

A still further object of my invention is to provide such apparatus that is compatible with the ordinary operations of CRT video displays as used in present day CAD procedures and that does not disrupt those operations.

A still further object of my invention is to provide such apparatus that is of new and novel design, of rugged and durable nature, of simple and economic manufacture and one otherwise well adapted to the uses and purposes for which it is intended.

Other and further objects of my invention will appear from the following specification and accompanying drawings which form a part of this application. In carrying out the objects of my invention, however, it is to be remembered that its accidental features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout

FIG. 5 is an isometric view of an alternative editing mechanism embodying an erasing ribbon and an impacting element.

FIG. 6 is an isometric view of a puck structure associated with the digitizer pad of my apparatus.

FIG. 8 is an enlarged, partially cut-away view of the apparatus of FIG. 1 showing the drafting film holding mechanism with drafting film in operative position.

DESCRIPTION OF THE PREFERRED EMBODIMENT

Figure 1:
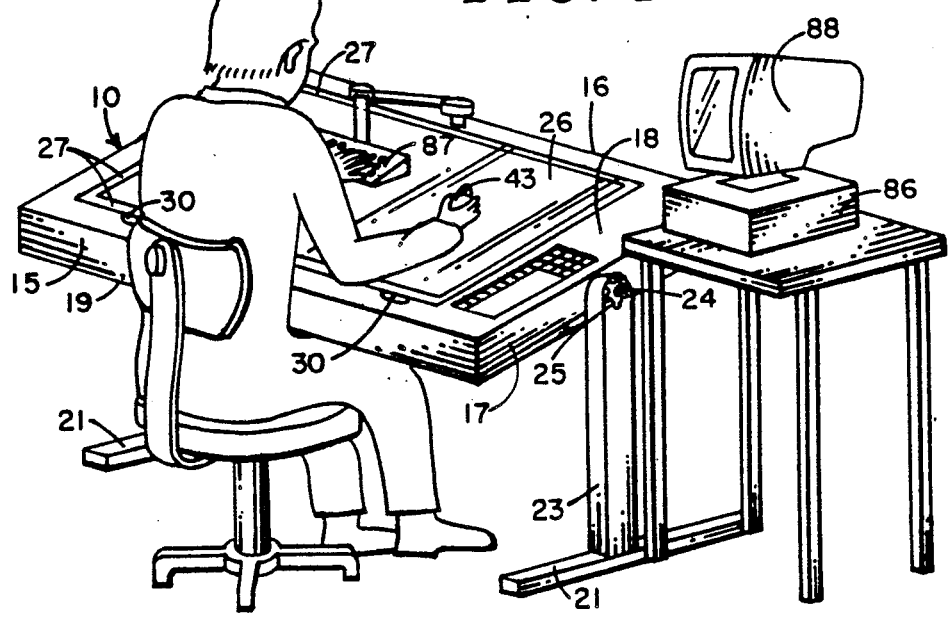
FIG. 1 is an isometric view of my apparatus mounted in a drawing board type support structure to show various of its parts, their configuration and relationship.

My invention generally provides rectilinear casement 10 having an openable top with drawing media holding mechanism 11 immediately therebeneath. The top provides a medial transparent working surface that embodies the pad of digitizer 12 which cooperates with a separable radio linked puck for data input. The casement carries plotter 13 which moves scribing and editing carriage 14 to create and edit images on drawing media carried by the drawing media holding mechanism.

Casement 10, as seen particularly in FIG. 1, provides a peripherally defined housing with front 15, back 16, similar sides 17, top 18, and bottom 19, all interconnected at adjacent edges to define internal chamber 20 for mounting and containment of operative mechanism of my apparatus. The casement elements, except the medial portion of top 18, are formed of some rigid, durable material generally of an opaque nature such as sheet metal or plastic and all are structurally joined.

Casement 10 is supported to allow an operator to conveniently work upon the upper surface of the casement top. In the instance illustrated in FIG. 1, this support is accomplished by a typical drafting table standard having foot elements 21 each carrying upstanding lateral support pillars 23, normally of an adjustable nature to allow adjustable vertical positioning of a supported casement. The upper portion of each support pillar journals jack axles 24 carried by casement 10 to pivotally mount the casement between the lateral supports and normally provides associated mechanism 25 to allow adjustment of the angulation of the casement relative to the lateral supports. This type of mounting structure is known in the drafting arts and is therefore not described in detail as it constitutes no portion of my invention per se. The casement may be supported by other structures such an upper flat surface of an ordinary desk or table, but the traditional drafting table support illustrated is preferred because of its greater convenience.

Top 18 is a peripheral frame-like element defining a medial void wherein top working surface 26 is carried. This top working surface constitutes a rigid transparent plate, generally formed of glass or transparent plastic material of appropriate strength, carried in peripheral frame 27 which is supported at its rearward edge for upward pivotal motion by hinges 28 communicating between the hingeably related members. Downward pivotal motion of frame 27, below a position substantially parallel with the surface of top 18, is prevented both by hinges 28 and stops 29, supported by the casement. The forward portion of casement 10 provides access holes 30 defined by the adjacent forward edge of top 18 to aid an operator's manipulation in pivotally moving the frame 27 to allow access to the structure therebeneath.

Figure 2:
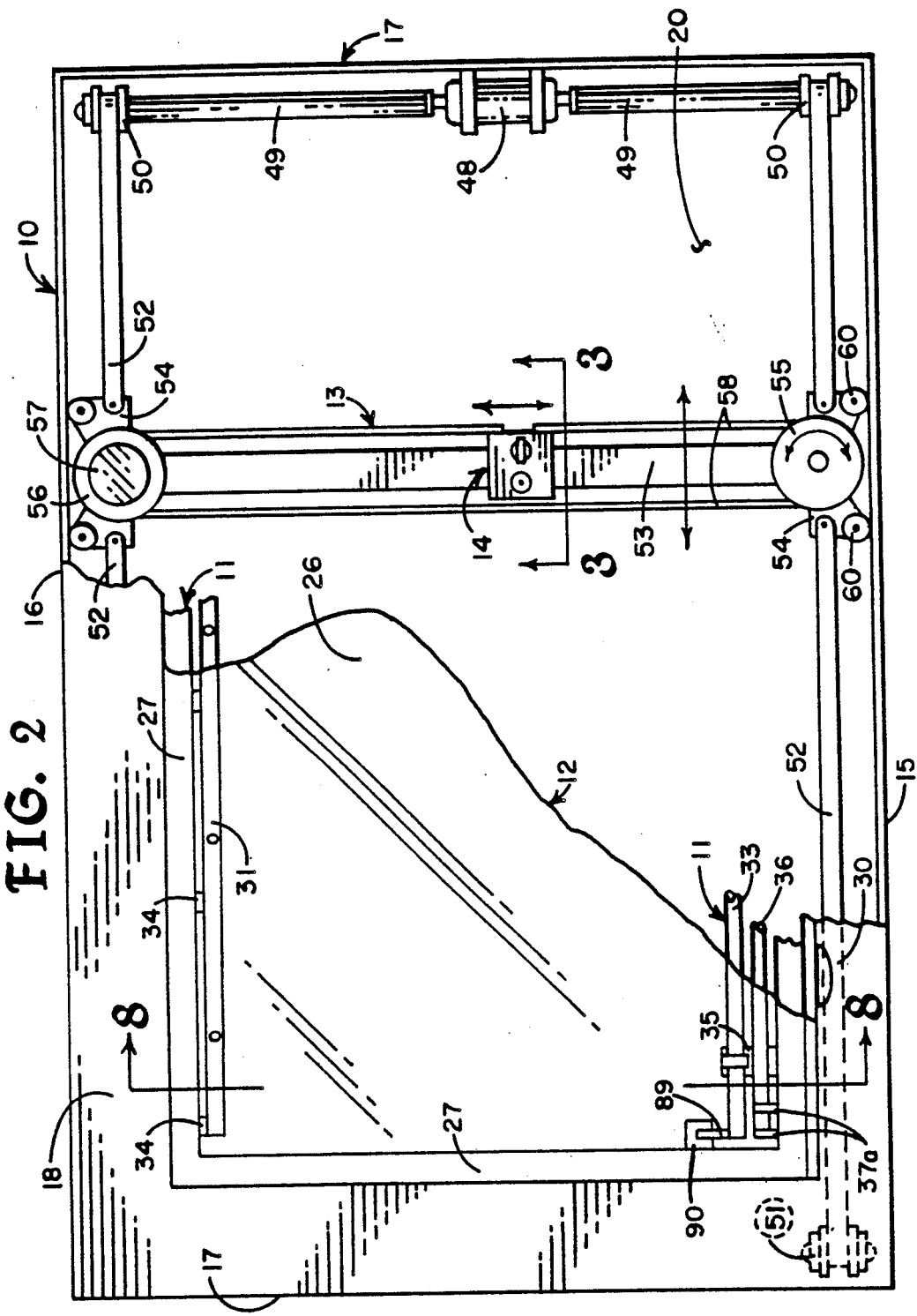
FIG. 2 is a partially cut-away orthographic plan view of the apparatus of FIG. 1, showing part of its internal structure.
Figure 7:
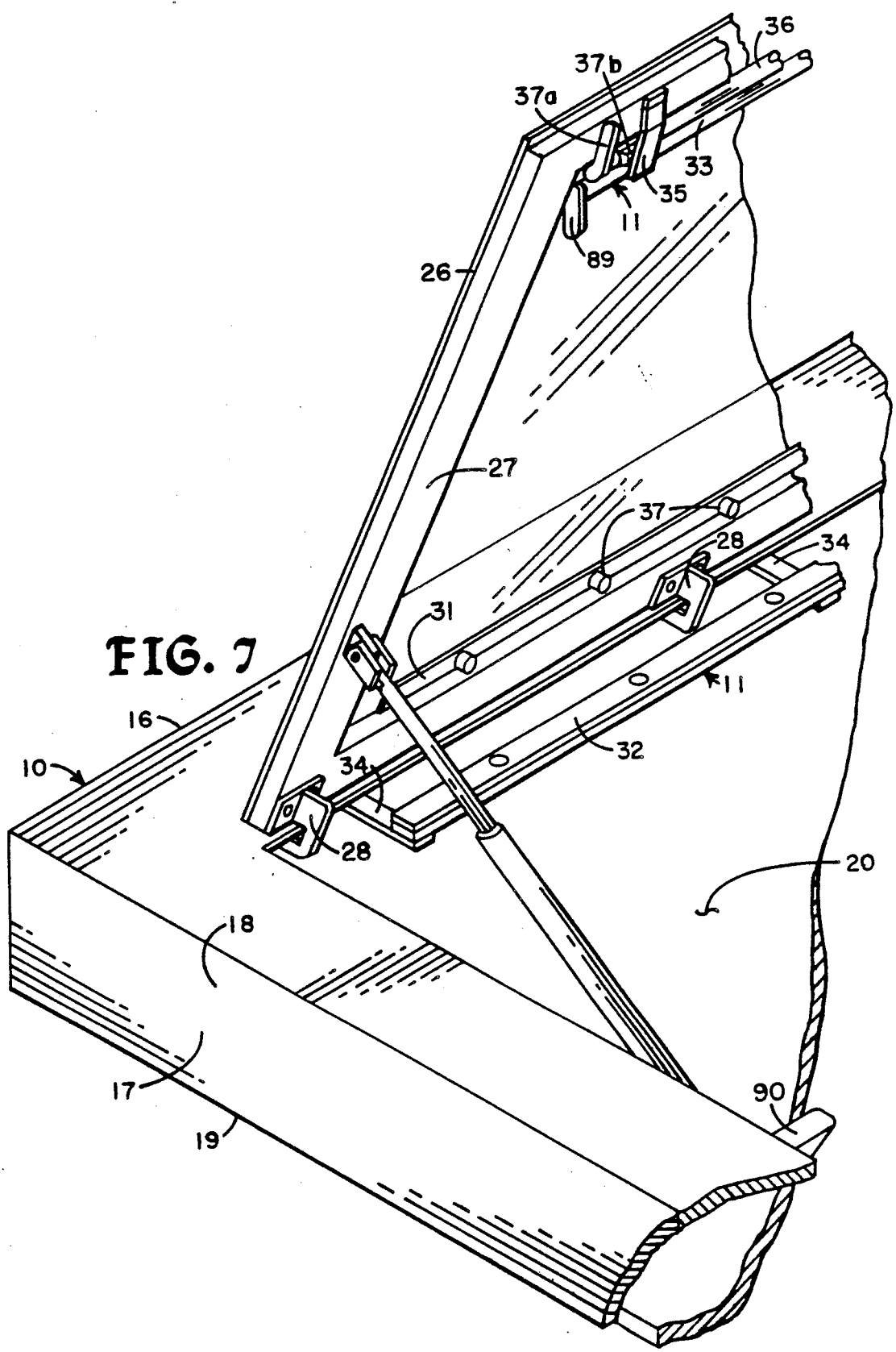
FIG. 7 is an enlarged partial isometric view of the opened working surface of my apparatus showing especially the drafting film alignment and fastening structure.

Drawing media holding mechanism 11, as shown particularly in FIGS. 2, 7 and 8, provides elongate upper pin fastening bar 31 supported inwardly adjacent the rearward periphery of the undersurface of transparent element 26 by adhesions. The fastening bar 31 provides a plurality of depending spaced media-engaging pegs 37 arrayed in a spaced elongate fashion. These pegs depend below the upper surface of fastening bar 31 sufficiently to engage holes defined in a sheet of drawing media to positionally maintain that media. Commonly the media-engaging pegs will have a cylindrical shape and circular horizontal cross-section for ease of use and maximum strength.

A lower pin fastening bar 32 carried by brackets 34 supported by frame 27, extends immediately below upper fastening bar 31 when the top element 26 is in its lowered operative position. This lower fastening bar 32 provides a somewhat resilient upper surface with spaced holes to receive the depending portions of pegs 37 carried by the upper bar 31 to aid in securely but releasably fastening the rearward edge of sheet drawing media between the fastening bars 31, 32.

Forward fastening bar 33 is carried inwardly adjacent the forward edge of top element 26 on its undersurface. The fastening bar 33 has a resilient peripheral coating to aid in holding drawing media and is supported by brackets 35 extending inwardly from frame element 27 which is structurally carried on the undersurface of top element 26. Fastening bar 33 is biased upwardly against the undersurface of top 26 by brackets 35 which are elastically resilient and by irrotatably carried biasing arm 89 resting on bracket 90 supported by the casement. The fastening bar 33 may be moved downwardly to release this bias by manually rotating release rod 36 by means of radially extending lever 37a which moves angularly related radially extending bracket dog 37b pivotally to correspondingly move bracket 35 downwardly. The release rod is pivotally carried above bracket 35 by frame 27, as illustrated in FIG. 8.

The preferred drawing media 38 for use with my apparatus is Mylar type plastic film having a matted surface prepared for drawing. This material is commonly used in CAD drawing, though most known materials of similar characteristics that are used for drawing may be used with my apparatus. Drawing media 38 defines pre-established spaced holes 39 inwardly adjacent one peripheral edge to allow mounting on fastening bar 31. Such drawing material and the means for uniquely positioning such material by fastening bars of the type described are known in the drafting art, where they are commonly used to create and position overlay type drawings, and preferably the drawing film holding elements of my invention are dimensioned, sized and arrayed so as to allow use of such available drawing film.

Digitizer 12 provides a digitizer field, as illustrated a pad structure 40 incorporated within transparent element 26 of the casement top and an associated separable but linked puck 43 to indicate predetermined points on the digitizer pad structure. Such transparent digitizers are known in the present day CAD art and constitute no novel part of my invention per se, but merely constitute an element necessary for its function. Digitizer pad 40 includes a plurality of spaced wires 41 generally extending in two perpendicular directions to form a rectilinear network of enclosed cells. The digitizer wires are interconnected in their end parts to known driver mechanism 42 which inputs a radio signal received by associated puck 43 to a central processing unit of a computer 86. Wires 41 or equivalent structures in the transparent digitizer pad 40 are either so small as not to interfere with vision through the pad or in some cases are transparent or substantially so themselves.

Puck 43 is a relatively small, hand-held and manipulated device that is physically separate from an associated digitizer pad and may be freely manually moved thereover to indicate points thereon This type of puck is also known in the CAD art for use with digitizer pads, and is not a part of my invention per se. As shown particularly in FIG. 6, the puck commonly provides a transparent window 44 having cross-hairs 45 to finely align the device at a particular position on the digitizer pad. The body of the puck defines at least one control button, and commonly a plurality of such buttons 46, to control different functions of the device Such a puck, as illustrated, is self-powered to generate a low powered radio signal that communicates the position of the puck to the adjacent digitizer pad 40. The particular puck illustrated has at least one additional display 47 to indicate various software generated indicia, particularly such as measurements between two sequential points.

Various other digitizer apparatus presently known may also be used with my apparatus. The Carteasian type described is probably most accurate and most available, but various vector type digitizers are operable and since they require no wire grid for their function, the transparent top surface 26 would not have to have any specialized construction as it does with the Cartesian type device.

Plotter 13 again is not novel, per se. and in essence is commercially available in present day CAD systems where it is commonly known as a "flatbed" type plotter. The plotter, as shown in FIG. 2, is physically carried within chamber 20 defined in casement 10 in such position that elements on its scribing and editing carriage 14 may operatively communicate with the undersurface of drawing film 38.

The plotter provides horizontal drive motor 48 mounted on casement 10 and having drive shafts 49 extending from each end to operatively communicate with driving pulleys 50 supported on casement 10 spacedly inwardly adjacent the front and back edges, respectively. Idler pulleys 51 are supported inwardly adjacent the opposite side of the casement to carry drive belts 52 between the opposed cooperating driving and idler pulleys in an array parallel to each other and adjacent both forward and rearward edges of transparent top element 26. With this mechanism, driving belts 52 are similarly moved in a direction relative to casement 10.

Figure 3:
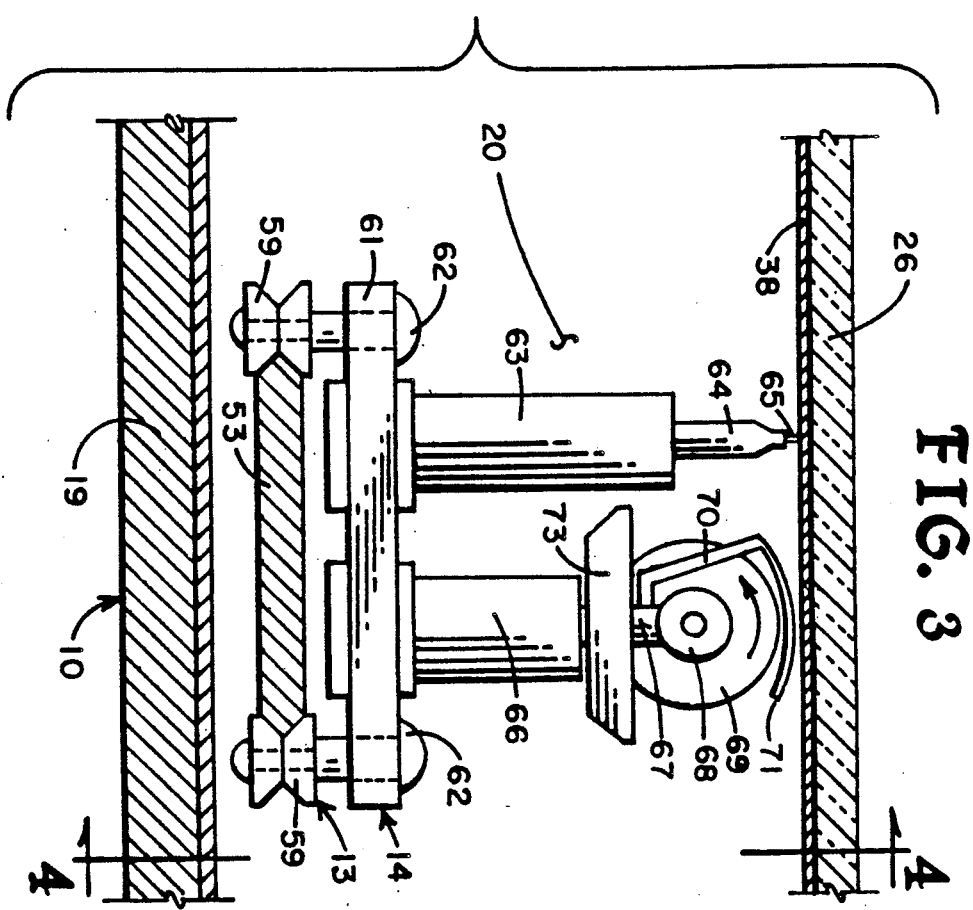
FIG. 3 is an enlarged partial cross-sectional view of the apparatus of FIG. 2, taken on the line 3—3 thereon in the direction indicated by the arrows, to show scribing and editing mechanism carried on the carriage beam of my plotter.
Figure 4:
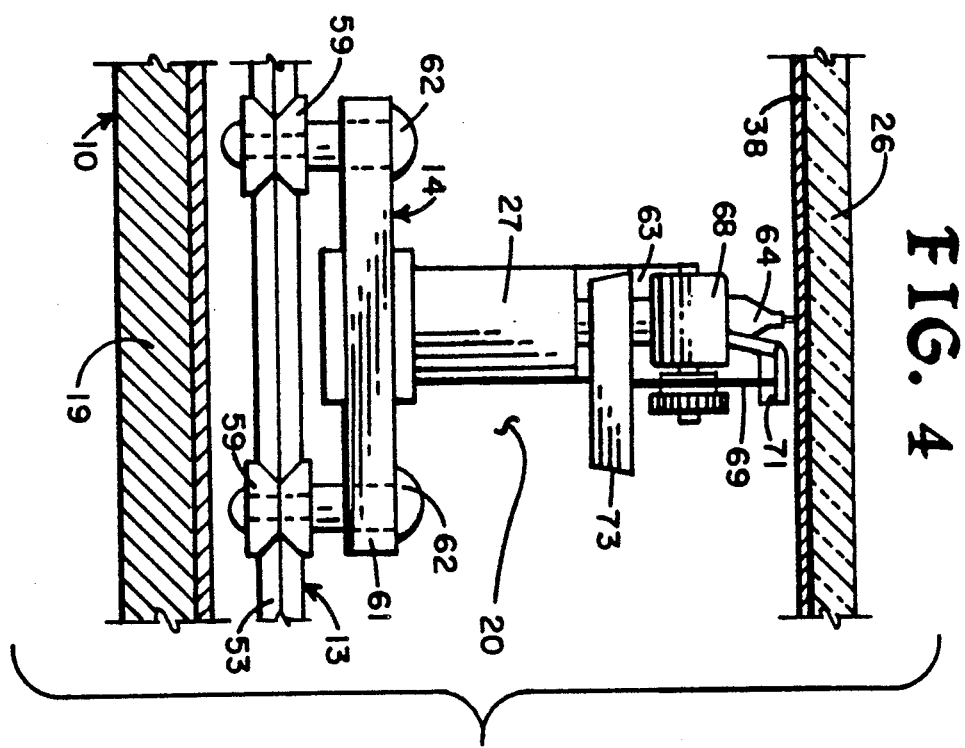
FIG. 4 is a partial cross-sectional view of the apparatus of FIG. 3, taken on the line 4—4 thereon in the direction indicated by the arrows.

Carriage beam 53 extends perpendicularly between the upper courses of spaced driving belts 52 and is operatively interconnected at each end to each driving belt by similar harnesses 54. One harness carries idler pulley 55 and the other carries driving pulley 56 powered by motor 57 with endless carriage belt 58 extending between pulleys 55, 56 to mount scribing and editing carriage 14 between its two courses so that the carriage is moved forwardly and rearwardly along the carriage beam responsive to lineal motion of belt 58. Commonly as seen in FIG. 3, carriage 14 is supported on the carriage beam 53 by plural wheels 59 to maintain accurate alignment and provide efficient motion. Harnesses 54 commonly will also be provided with guide wheels 60 that are rollably supported on the inner surface of the front and back of casement 10 for the same purpose. This described structure is not novel, per se, and is known in present day flatbed plotters for CAD. Motors 48, 57 are electrically powered and controlled by the central processing unit of an associated computer through driving devices and software presently known in the CAD arts for such purposes.

Scribing and editing carriage 14 provides means for creating images on, and removing images from, the lower surface of drawing film 38. A first species of this mechanism is shown particularly in FIG. 3. The drawing mechanism is known in present-day flatbed plotters, but the correcting or editing means are not.

The scribing and editing carriage 14 provides base 61 supported by pillars 62, which in turn are carried by or coextensive with the axles journaling carriage wheels 59 so as to position base 61 spacedly above carriage beam 53. Base 61 supports upstanding scriber body 63, which in turn supports scriber 64 carrying marking mechanism 65 in its upper end for limited vertical motion. In operation, scriber 64 is biased to a downward position and moved upwardly by a relay responsive to controlling software and a driver device to move marker 65 into and out of operative drawing contact with the lower surface of drawing film 38. This mechanism is known in present day CAD plotter and software systems, except that the scriber is moved downwardly in present systems rather than upwardly as in my system to come into operative contact with drawing film.

A rotating eraser-type editor is illustrated in FIG. 3. It provides upstanding body 66 supported on carriage 61 and carrying eraser post 67 therein for limited vertical motion similar to that of the scriber. The eraser post in its upper part carries motor 68 which powers relatively thin eraser disk 69 for rotary motion. Shield arm 70 is supported by eraser post 67 to extend upwardly to support shield 71 between the upper portion of eraser disk 69 and the lower portion of drafting film 38. The shield defines an appropriate orifice to limit the erasing action of eraser disk 69 to a small area to allow removal of small portions of an image without removing other image portions adjacent thereto in the traditional action of an erasing shield. With this structure, eraser disk 69 is rotated with the upper portion of the disk projecting through shield 71 so that when the eraser post be moved upwardly into operative contact with the lower surface of drawing film 38, a portion of an image may be removed from the film by appropriate positioning of the scribing and editing carriage 14, in a fashion similar to the drawing of lines on that film and responsive to existing software commands.

Preferably, a downwardly concave collection disk 73 is positioned about the upper portion of the eraser structure to contain debris created thereby and allow its removal through a vacuum disposal system (not shown) to be ultimately collected for disposal.

A second species of impact-type erasing device is shown in FIG. 5. This device provides body 76 carried in an upstanding position on scribing and editing base 61. The body carries striker rod 77 for limited vertical motion into and out of impact type contact with the undersurface of drawing film 38. Upper portion 78 of the striker rod tapers to a truncated point, generally of substantially the size of thinnest lines to be removed by the device from a drawn image. Ribbon supply reel 79 and ribbon take-up reel 80 are supported by brackets carried by base 61 for rotary motion on opposite sides of striker rod 77. Motor 81 supported by the adjacent reel bracket and ultimately by base 61 of the scribing and editing carriage drives take-up reel 80 to move tape supported thereon from the supply reel across the upper surface of striker rod 77. Plural tape guides 82 are supported by striker body 76, on both sides of the truncated point 78 of the striker rod, to maintain ribbon 83 immediately above truncated point 78 of the striker rod. Ribbon 83 is formed of a relatively narrow band of flexible support material, such as plastic sheet material used in ordinary typewriter or computer ribbons, and is coated on its upper surface with a layer of impact activated erasing material, commonly of a vinyl-type as used in present day drafting arts to erase images from Mylar type drawing film. This type of vinyl erasing material has been found to be effective in removing images by reason of impact force thereon, as well as by traditional frictional rubbing motions. It may be necessary to impact the same area of an image to be removed more than once to cause image removal, but if so, this can be accomplished by a software generated function as known in the computer arts. This impact type eraser means has the advantage of not causing debris in the casement chamber and is preferred because of this.

Figure 9:
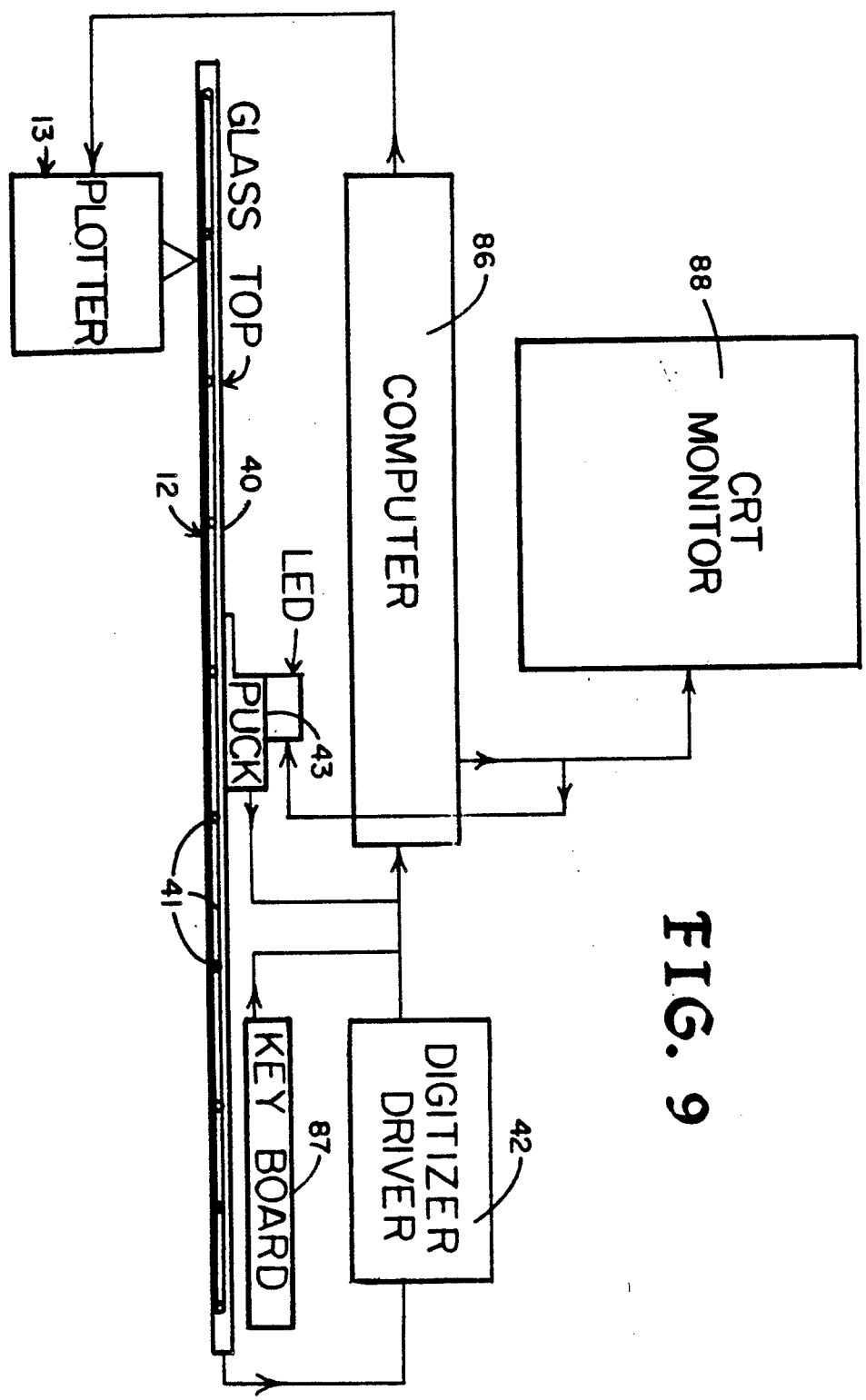
FIG. 9 is a flow diagram showing the relationship of my invention in a typical computer system.

Having described the structure of my invention, its operation may be understood, especially with reference to FIG. 9 of the drawings.

As seen in FIG. 9, computer 86 receives input signals communally from keyboard 87 and digitizer 12. This input is processed by the computer's central processing unit and output to traditional cathode ray tube (CRT) monitor 88, to plotter 13 and to the display device of puck 43. The software accomplishing these functions is the traditional CAD software of present day commerce, and the drivers operating the output devices again are of the ordinary type heretofore known in CAD drawing, except that plotter output is generated simultaneously with drawing input, rather than in the traditional fashion of present day drawing systems which provide plotter output from a drawing file at a time after the drawing input to the file. This function is accomplished by known software means in substantially the same fashion as drawing output is simultaneously shown by a CRT monitor upon its input by known CAD software Such software is not per se a part of the instant invention.

The puck input keys function in the same manner as the keys of an ordinary computer keyboard. They are merely an adjunct to a keyboard and may be programmed in known fashion for particular key output and with various so-called macro functions if desired. The puck output displays may be programmed to provide various output functions in the same fashion as such functions may be displayed on a CRT monitor. Commonly I prefer that my puck display at least distance measure between two sequential points so that the puck, by reason of its motion between those two points, automatically serves as a measuring device which is of substantial convenience in traditional engineering and architectural drawing. In the apparatus disclosed, drawing is carried out in a real time relationship and in substantial size on an image displaying the current drawing contents to make distance measurements more meaningful than in prior CAD drawing.

The input functions of the puck and digitizer pad and the keyboard are substantially identical in my invention to those of the same elements presently used in known CAD systems. The output to the plotter and plotter motion, similarly, are substantially identical to the function of those same elements in their traditional plotting activities in known CAD systems, except that those activities take place simultaneously with and responsive to drawing input.

It should be noted that though the digitizer pad of my apparatus is described as a Cartesian type in the top surface of the casement above the plotting mechanism, it might also be carried below the plotting mechanism without departing from the concept of my invention. Many digitizer pads allow puck communication from a substantial spaced distance which is quite enough to allow this type of construction.

It should further be noted that various other known types of digitizers may be used, especially those that are carried above a working surface such as the acoustically operated type and the mechanically operated type that is similar in structure to an ordinary mechanical drafting machine.

The foregoing description of my invention is necessarily of a detailed nature so that specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. An input and display device for computer aided drawing that plots and edits an image on drawing media simultaneously upon input of drawing data to a central processing unit of a computer, comprising, in combination:

a peripherally defined casement having opposed front and back sides and a top with a rigid transparent top working surface, said casement defining a medial chamber carrying a plotter, and said top working surface being movably carried to allow access to its undersurface and to the medial chamber defined by the casement and having means for uniquely positioning and positionally maintaining drawing media on its undersurface;

a digitizer having a digitizer field on the casement top working surface, and a puck for movement over the top working surface to input puck position relative to the top working surface to a computer; and a plotter carried in the chamber defined by the casement, said plotter having a scribing and editing carriage carried by a plotter beam for motion parallel to the plotter beam and said plotter beam carried by linkage for motion perpendicular to the plotter beam, said plotter motion being controlled by computer generated signals and said scribing and editing carriage having scribing means and editing means operatively communicating with the under surface of drawing media carried on the underside of the top working surface.

2. The apparatus of claim 1 wherein the means of positioning drawing media beneath the top working surface comprises:

an upper rearward fastening bar, having a plurality of spaced depending fastening pegs, carried on the undersurface of the top working surface adjacent the rear side, and a lower fastening element carried by the casement below the upper fastening bar to accept sheet drawing media defining cooperating holes to fit over the pegs depending from the upper fastening bar to positionally maintain the drawing media immediately beneath the undersurface of the top working surface and between both fastening bars, and a forward fastening bar adjacent the front edge of the underside of the top working surface to releasably fasten the forward edge of a sheet of drawing media.

3. The apparatus of claim 1 wherein the digitizer field comprises a digitizer pad incorporated within the transparent element forming the top working surface of the casement.

4. The apparatus of claim 1 wherein the scribing and editing carriage comprises:

a base carrying an upwardly extending scriber body carrying a vertically extending scriber for limited vertical motion responsive to computer generated signals, said scriber having marking means in its upper portion to contact the undersurface of drawing media supported on the undersurface of the top working surface of the casement when in upward media contacting position.

5. The apparatus of claim 1 further characterized by:

the scribing and editing carriage having a base carrying an upwardly extending eraser support carrying an eraser post for limited vertical motion responsive to computer generated signals, said eraser post carrying in its upper portion a motor driving an eraser for rotation, said eraser post being movable upwardly responsive to computer generated signals to cause the eraser to contact the surface of drawing media supported on the undersurface of the top working surface.

6. The apparatus of claim 1 further characterized by the digitizer puck having a plurality of programmable keys for computer input of keyboard signals to a computer and a visual display to display at least one selected output function of an associated computer.

7. The apparatus of claim 1 further characterized by the editing means carried by the scribing and editing carriage comprising an impact eraser member having a striker post carrying a striker element for limited vertical motion between the drawing media undersurface to a distance spacedly therebelow, and a flexible tape movable over the upper surface of the striker element responsive to striker element motion, said tape carrying impact type erasing material on its upper surface to erase a part of an image on drawing media beneath the point of striker element impact thereon.

8. An input and display device for computer aided drawing that plots and edits an image on drawing media simultaneously upon input of data to an associated computer, comprising in combination:

a rigid peripheral casement having forward and rearward edges and defining a medial chamber and having a transparent top working surface movably mounted to allow access to the underside of the top working surface and the medial chamber and means for uniquely and releasably positioning and positionally maintaining drawing media immediately adjacent the underside of the top working surface;

a digitizer pad carried in the top working surface, said digitizer pad having means for determining the position of a separable puck at a spaced distance above the digitizer pad and of communicating the puck position to an associated computer and a separable puck for movement over the upper side of the top working surface with means to communicate puck position to the digitizer pad; and a plotter, carried in the chamber defined by the casement beneath the top working surface for operative communication with drawing media positioned on the underside of top working surface, said plotter having a forwardly and rearwardly extending plotter beam movable laterally responsive to computer generated signals, said plotter beam carrying a scribing and editing carriage thereabove for forward and rearward motion along the plotter beam responsive to computer generated signals and said scribing and editing carriage carrying an upwardly extending scriber element movable from a normally null position spacedly below the drawing media to a marking position in contact with the drawing media responsive to computer generated signals and editing means movable from a normally null position spacedly below the drawing media to an operative position making surface contact with the drawing media responsive to computer generated signals.

9. The invention of claim 8 wherein the editing means comprise an eraser support carried by the scribing and editing carriage, said eraser support carrying an eraser post for limited vertical motion and said eraser post carrying in its upper portion motor means driving an eraser for rotation and having associated means to remove eraser debris from the casement.

10. The invention of claim 8 further characterized by the editing means comprising a striker post extending upwardly from the scribing and editing carriage and carrying at least one striker element for a limited vertical motion to contact the underside of drawing media in an impact fashion, and flexible tape means moving a flexible tape over the upper surface of the striker element responsive to striker motion, said flexible tape carrying erasing material on its upper surface to erase a portion of an image on drawing media upon striker element impact on the lower surface thereof.

11. In an input and display device for computer aided drawing, that plots and edits an image on drawing media simultaneously upon input of drawing data to a central processing unit of a computer, which has a peripheral casement, with a top having a transparent top working surface, said casement defining a medial chamber carrying a plotter, said top working surface being movable to allow access to its underside and to the medial chamber and having associated means for uniquely positioning and positionally maintaining drawing media upon the underside of the top working surface, the invention comprising:

a digitizer field on the upper side of the top working surface and a separable puck movable in the digitizer field with means for relating the position of the separable puck in the digitizer field to position the puck on the top working surface and of communicating such information to an associated computer; and a plotter carried in the medial chamber beneath the top working surface for operative communication with drawing media positioned on the underside of top working surface said plotter having a forwardly and rearwardly extending plotter beam movable laterally responsive to computer generated signals, said plotter beam carrying a scribing and editing carriage extending thereabove for forward and rearward motion along the plotter beam responsive to computer generated signals and said scribing and editing carriage carrying an upwardly extending scriber element movable from a normally null position spacedly below the drawing media to marking position in contact with the drawing media pursuant to computer generated signals and editing means movable from a normally null inoperative position spacedly below the drawing media to an operative position making surface contact with the drawing media responsive to computer generated signals.

12. The invention of claim 11 wherein the editing element comprises an upstanding eraser support carried by the scribing and editing carriage, said eraser support carrying an eraser post for limited vertical motion and said eraser post carrying in its upper portion motor means driving an eraser for rotation.

13. The invention of claim 11 further characterized by the editing element comprising a striker post extending upwardly from the scribing and editing carriage and carrying at least one striker element for limited vertical motion to contact the lower surface of drawing media in an impact fashion, and flexible tape means moving a flexible tape over the upper surface of the striker element responsive to striker motion, said flexible tape carrying erasing material on its upper surface to erase a portion of an image on drawing media responsive to striker element impact on the under surface of said flexible tape.

* * * * *